United States Patent
Hertzberg et al.

(10) Patent No.: US 7,908,456 B2
(45) Date of Patent: Mar. 15, 2011

(54) SYSTEM AND METHOD FOR ALLOCATING AND DEALLOCATING MEMORY WITHIN TRANSACTIONAL CODE

(75) Inventors: Ben Hertzberg, Santa Cruz, CA (US); Bratin Saha, San Jose, CA (US); Ali-Reza Adi-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/615,565

(22) Filed: Nov. 10, 2009

(65) Prior Publication Data
US 2010/0122060 A1 May 13, 2010

Related U.S. Application Data

(63) Continuation of application No. 11/415,523, filed on May 2, 2006, now Pat. No. 7,636,829.

(51) Int. Cl.
G06F 12/00 (2006.01)
G06F 17/30 (2006.01)

(52) U.S. Cl. ............... 711/170; 711/156; 707/999.102; 707/999.202

(58) Field of Classification Search ............... None
See application file for complete search history.

(56) References Cited

U.S. PATENT DOCUMENTS

| | | | |
|---|---|---|---|
| 5,455,944 A | 10/1995 | Haderle et al. | |
| 5,832,508 A | 11/1998 | Sherman et al. | |
| 6,185,663 B1 | 2/2001 | Burke | |
| 6,353,829 B1 | 3/2002 | Koblenz et al. | |
| 6,427,195 B1 | 7/2002 | McGowen et al. | |
| 6,490,671 B1 | 12/2002 | Frank et al. | |
| 6,529,948 B1 | 3/2003 | Bowman-Amuah | |
| 6,732,124 B1 | 5/2004 | Koseki et al. | |
| 6,848,033 B2 | 1/2005 | Joseph | |
| 7,043,509 B2 | 5/2006 | Detlefs | |
| 7,185,167 B2 | 2/2007 | Sollich | |
| 7,299,269 B2 | 11/2007 | Elving | |
| 2002/0087734 A1 | 7/2002 | Marshall et al. | |
| 2003/0140085 A1 | 7/2003 | Moir et al. | |
| 2008/0154840 A1 | 6/2008 | Rathi et al. | |

FOREIGN PATENT DOCUMENTS
CN 5455944 10/1995

OTHER PUBLICATIONS
Non-Final Office Action for U.S. Appl. No. 11/415,523, Mailed Mar. 13, 2009, 11 pages.

(Continued)

*Primary Examiner* — Jack A Lane
(74) *Attorney, Agent, or Firm* — Shireen Irani Bacon

(57) ABSTRACT

Methods and systems are provided for managing memory allocations and deallocations while in transactional code, including nested transactional code. The methods and systems manage transactional memory operations by using identifiers, such as sequence numbers, to handle memory management in transactions. The methods and systems also maintain lists of deferred actions to be performed at transaction abort and commit times. A number of memory management routines associated with one or more transactions examine the transaction sequence number of the current transaction, manipulate commit and/or undo logs, and set/use the transaction sequence number of an associated object, but are not so limited. The methods and systems provide for memory allocation and deallocations within transactional code while preserving transactional semantics. Other embodiments are described and claimed.

17 Claims, 3 Drawing Sheets

OTHER PUBLICATIONS

"International Preliminary Report on Patentability", International Application No. PCT/US2007/010483; Filing date May 1, 2007; mailed Nov. 13, 2008; 6 pages.

Notice of Allowance, U.S. Appl. No. 11/415,523, Mailed Aug. 10, 2009, whole document.

"PCT International Search Report" International Application No. PCT/US2007/010483; Filing date May 1, 2007; mailed Nov. 7, 2007; whole document.

First Office Action mailed Apr. 13, 2010 (Chinese Associate mail date May 26, 2010) for Chinese Application No. 200780015529.9, Translation.

SYSTEM AND METHOD FOR ALLOCATING AND DEALLOCATING MEMORY WITHIN TRANSACTIONAL CODE

CROSS-REFERENCE TO RELATED APPLICATIONS

This application is a Continuation Application of and claims priority to U.S. application Ser. No. 11/415,523 now U.S Pat. No. 7,636,829, entitled "System and Method for Allocating and Deallocating Memory within Transactional Code", filed May, 2, 2006.

BACKGROUND

To satisfy the growing demands of users, computing systems are required to operate efficiently at faster and faster speeds with little or no associated downtime. In efforts to accommodate these demands, programmers construct programs which may include multiple instruction "threads" having a number of instructions. These threads control the operation and flow of the program (or application) running on the system. In some computing architectures, one processor may execute multiple threads using a single processor. In other computing architectures, multiple threads may be executed by multiple processors, where each processor may support a different thread.

In conjunction with threaded programs, programmers use transaction coding, including nested transactions, to improve computing synchronization and efficiency. Transactions are a key technology for easing programming on multi-core architectures. A transaction may be described as a sequence of steps executed on a thread. Transactions are also referred to as being "atomic," since a transaction typically commits or aborts. For example, one transaction model begins when a thread announces the start of a transaction, executes a sequence of operations, and then tries to commit the transaction. If the commit succeeds, the transaction operations take effect in memory, if not, the operations may be discarded. Nested transactions may occur in transactional programs when they call library code that uses transactions internally. Nested transactions also allow programmers to avoid expensive rollbacks when potential conflicts are limited within a small portion of a large transaction.

Conventional computing systems allow programs to allocate and deallocate memory dynamically. However, to preserve semantics, these conventional computing systems do not allocate and deallocate memory from within a transactional code block, including nested transactions. A conventional computing system, exclusive of transactions, may allocate a block of memory when a program invokes a memory allocation routine, such as a standard malloc routine for example. The malloc routine finds a free memory block, marks the block as being allocated, and returns a pointer to the program which corresponds to the allocated block. The program may use the pointer to store data to the memory block. The program may free the memory block, using a standard free routine for example, when the block is no longer required. The free routine marks the memory block as being free so that the block may be otherwise allocated. As stated above, currently, these standard or conventional memory allocation and deallocation techniques are not used in conjunction with transactional code blocks, since the semantics associated with the transactional code may not be preserved when using the standard malloc and free routines.

DETAILED DESCRIPTION

Embodiments of methods and systems provide for managing memory allocations and deallocations while in transactional code, including nested transactional code. Various embodiments provide transactional memory management by using one or more unique identifiers, such as one or more sequence numbers, to handle memory management in transactions. Embodiments also maintain lists of deferred actions to be performed at transaction abort and commit times. A number of memory management routines associated with one or more transactions examine the transaction sequence number of the current transaction, manipulate commit and/or undo logs, and set/use the transaction sequence number of an associated object, but are not so limited. The transactional memory management techniques described herein for handling memory management in transactions, including nested transactions, may be applied when handling other events in transactional and other settings. The transactional techniques described herein provide an efficient and valuable tool for easing programming on multi-core and other architectures.

Transactional code represents a powerful construct for managing concurrency to eliminate deadlocks, make it easier to compose atomic primitives, and automatically provide fine-grained concurrency. Transactions may be implemented either in hardware, software, or a combination thereof. A software implementation may be more programmer friendly, imposing limited size constraints on the transaction and allowing for nesting transactions. When a transaction commits, changes made during the transaction are typically stored in memory. When a transaction aborts, allocations and/or deallocations may need to be undone or "rolled back."

In the following description, numerous specific details are introduced to provide a thorough understanding of, and enabling description for, embodiments of the systems and methods. One skilled in the relevant art, however, will recognize that these embodiments may be practiced without one or more of the specific details, or with other components, systems, etc. In other instances, well-known structures or operations are not shown, or are not described in detail, to avoid obscuring aspects of the disclosed embodiments.

Figure 1:
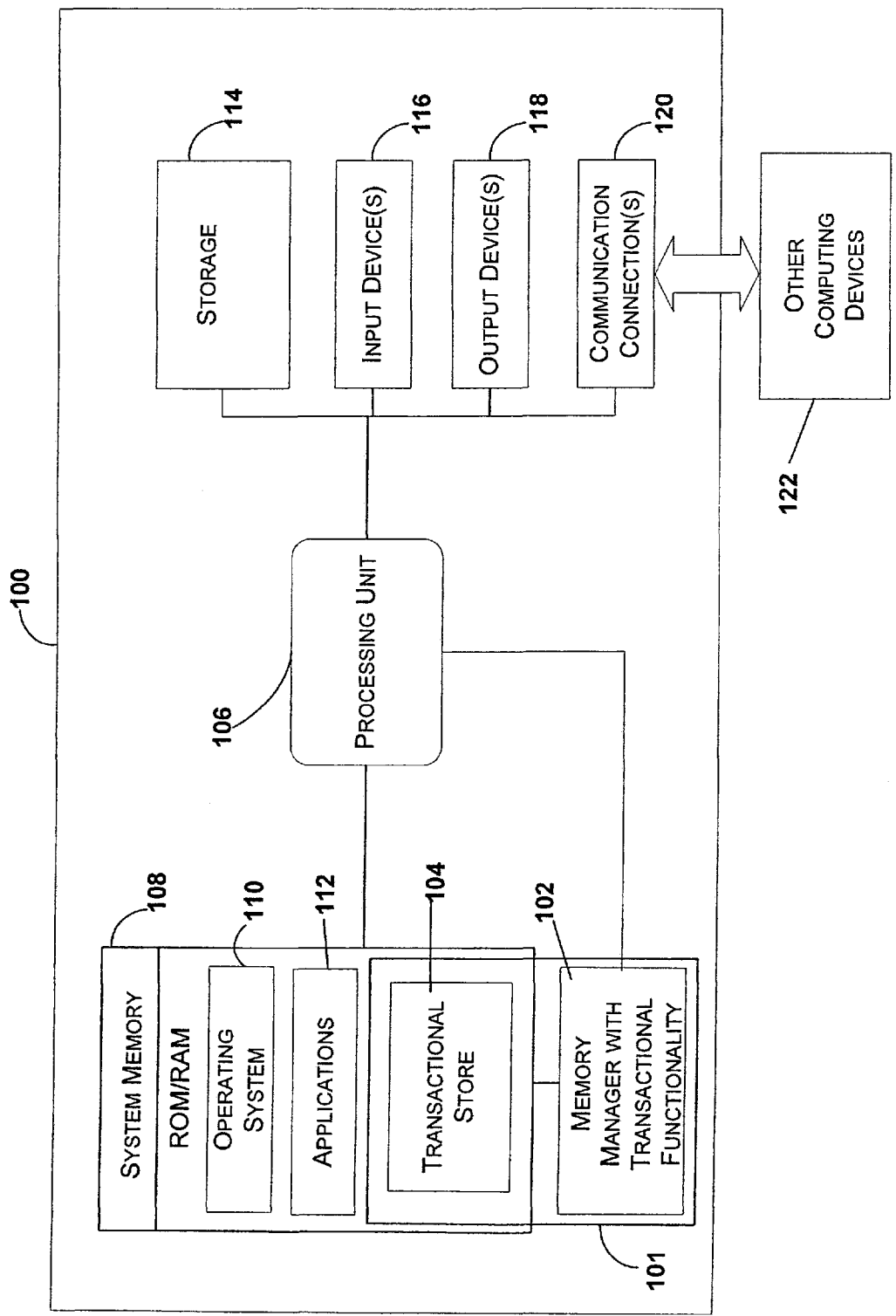
FIG. 1 is a block diagram of a computing device including a memory management system having transactional functionality, according to an embodiment.

FIG. 1 illustrates a computing device 100 including a transactional memory management system 101 having an associated memory manager 102 and transactional store 104 according to an embodiment. As described below, the transactional store 104 includes a number of routines or modules for managing operations associated with a transaction, but is not so limited. The transactional memory management system 101, memory manager 102, and transactional store 104 are described below in detail as represented by the transactional memory management system 200, memory manager 204, and memory support library 206, as shown in FIG. 2.

The memory manager 102 may be implemented in any combination of software algorithm(s), firmware, and hardware running on one or more processors, where the software may be stored on any suitable computer-readable medium, such as microcode stored in a semiconductor chip, on a computer-readable disk, etc. While the memory manager 102 and computing device 100 may be shown as co-located, the embodiments are not to be so limited. The memory manager 102 of various alternative embodiments may distribute one or more functions among any number and/or type of components, modules, and/or circuitry of the computing device 100 or other system.

The computing device 100 includes any computing system, such as a handheld, mobile computing system, a desktop computing system, laptop computing system, graphics-specific computing system, and other computing systems. The computing device 100 typically includes at least one processing unit 106 and system memory 108. In other embodiments, the computing device 100 may include multiple processors and other components. Depending on the configuration and type of computing device, system memory 108 may be volatile (such as random-access memory (RAM) or other dynamic storage), non-volatile (such as read-only memory (ROM), flash memory, etc.), or some combination. The system memory 108 may also include transactional memory functionality, implemented as software, hardware, or a combination thereof The system memory 108 may include an operating system 110 and one or more applications 112. Computing device 100 may include additional computer storage 114, such as magnetic storage devices, optical storage devices, etc. Computer storage includes, but is not limited to, RAM, ROM, electrically erasable programmable read-only memory (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which may be used to store information. Computing device 100 may also include one or more input devices 116 and one or more output devices 118. Computing device 100 may also contain communication connections 120 that allow the computing device 100 to communicate with other computing devices 122, processors, and/or systems, such as over a wired and/or wireless network, or other network.

Figure 2:
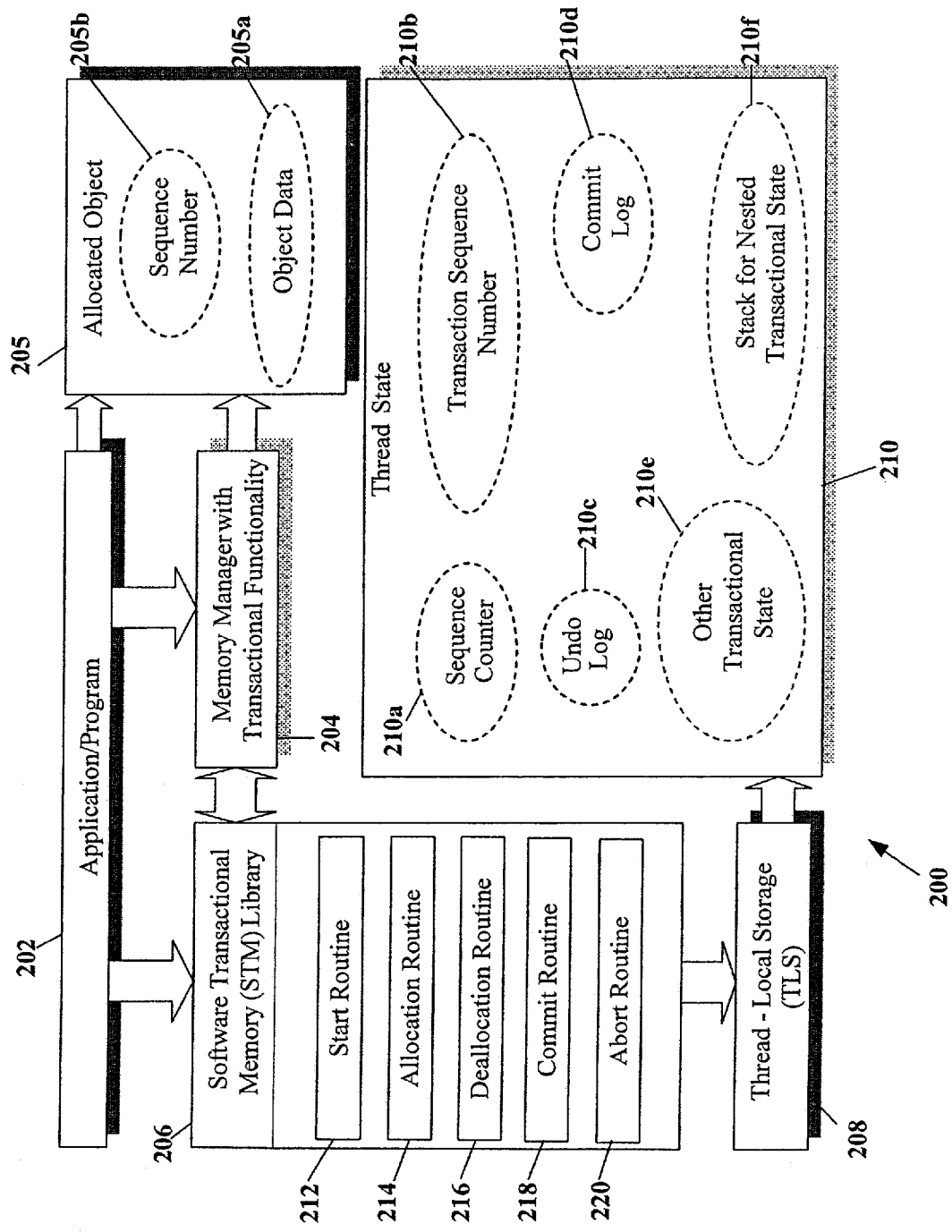
FIG. 2 is a block diagram of a memory management having transactional functionality, according to an embodiment.

FIG. 2 is a block diagram of a transactional memory management system 200, according to an embodiment. While an application 202 is shown in FIG. 2, the transactional memory management system 200 may interact with other clients (e.g. drivers, devices, etc.) The description of the transactional memory management system 200 will include "C" programming constructs for illustration, however, the embodiments are not so limited.

As described in detail further below, the transactional memory management system 200 is able to allocate and deallocate memory while in a transaction code block, including nested transactional code blocks, but is not so limited. In a program or application, a transaction generally refers to a section of code that should execute atomically. In certain cases, while transactional code is being executed, memory may only be changed tentatively and not permanently. After completing the transaction code, if it is determined that the execution occurred atomically, then the transaction may be committed by making changes to the memory permanent. Otherwise, if there is a conflict with another transaction, the transaction may be aborted and tentative changes made to memory may be discarded.

The transactional memory management system 200 includes a memory manager 204 that interacts with a software transactional memory (STM) library 206, application 202, and allocated object 205. According to an embodiment, an allocated object refers to a virtual memory block associated with an allocation or deallocation procedure using the transactional memory management system 200. As an example, the application 202 may use the memory manager 204 to allocate and/or deallocate the object 205 based on various criteria described below.

As shown in FIG. 2, the allocated object may include two regions: a first region 205a used by the application 202 to store data, and a second region 205b that is used to store a "sequence number" (the sequence number field). In various embodiments, the sequence number field may be part of an object header, a separate table, or thread-local storage 208, depending on a particular implementation. As described below, the object's sequence number and other information may be used when determining whether an object is speculatively allocated, speculatively free, balanced free etc. Speculative allocations and deallocations may assist in reducing memory latency that may result if the associated operation only issued when it was known for sure whether the operation were to occur. While one configuration of the transactional memory management system 200 is shown in FIG. 2, other configurations are available.

Thread-local storage (TLS) 208 provides storage for storing information associated with one or more software threads, including any associated transactions. In an embodiment, each software thread has a unique thread-local storage space in memory. Thread-local storage 208 may be part of the system memory 108, such as RAM, but is not so limited. The thread-local storage 208 includes a thread state 210 that is associated with one or more transactions and other information, including nested transactions.

According to an embodiment, the thread state 210 includes a sequence counter 210a, transaction sequence number 210b, an undo log 210c, a commit log 210d, other transactional state 210e, and stack for a nested transactional state 210f In order to maintain the correct semantics at commit and abort points, operations that may need to be undone are logged in the undo log 210c and commit log 210d. The undo log 210c is a log of all allocations that may need to be undone in the event of a transaction abort. To undo an allocation, the memory is freed, but is not so limited. The commit log 210d is a log of all deallocations that are not guaranteed to be performed until a later commit and must therefore be deferred. To commit a deallocation, the memory is freed, but is not so limited.

As described further below, one or more indicators, such as one or more sequence numbers, may be used by the system 200 to efficiently determine when a memory allocation may be safely freed. A sequence number may be a thread-local value that may be incremented to provide a unique ordering among all transactions on a thread (including nested transactions). An n-bit sequence number (64-bit for example) may be used which may prevent an overflow of the sequence number. When performing a deallocation, the sequence number of an object 205b to be deallocated is compared to the sequence number 210b of the current transaction. The relationship between sequence numbers determines whether the free operation is "balanced" or "speculative free." The relationship between sequence numbers also determines whether an allocation is "speculative."

As an example, there may be three transactional states associated with a transaction, as shown below. TABLE-US-00001//initially, seq(trans)=0 outside transaction x=malloc(size); //seq=0 transaction {//seq(trans)=1 y=malloc(size); //seq =1 z =malloc(size); //seq=1//Point A free(x); //(1>0) is true so speculatively freed//Point B free(y); //(1>1) is false so balanced free}//at commit, transaction number is popped ->seq(trans)=0//undo log is cancelled//commit log (containing free(x)) is processed//(0>0) is false so free(x) becomes balanced free//Point C free (z); //(0>1) is false so balanced free end.

At point A, y and z are referred to as being speculatively allocated. That is, in the event of a transactional abort at this point, y must be deallocated in order to rollback the state to the start of the transaction. At point B, x is referred to as being speculatively free. That is, in the event of a transactional abort at this point, the memory pointed to by x must have remained valid. In other words, the deallocation of x should be deferred. In contrast, the deallocation of y may not need to be deferred, since the final state of y is deallocated, regardless of whether a transactional commit or abort occurs. This state of y is referred to as balanced. That is, after reaching the free operation, the transaction commits or aborts. If the transaction aborts, it is as if the memory was never allocated in the first place because the operations of the transaction is rolled back. If the transaction commits, both the allocation and the free will be committed, and the block of memory is still freed. Consequently, the block is free irrespective of whether the transaction commits. At point C, z is no longer speculatively allocated, as the allocation has been committed, assuming that an abort was not encountered.

As used in the description of the various embodiments, but not limited to:

1) malloc inside a transaction is referred to as a speculative allocation.

2) free of an object inside a transaction when seq(object) <seq(transaction) is referred to as a speculative free.

3) free of an object inside a transaction when seq (object)>=seq(transaction) is referred to as a balanced free.

4) abort of a transaction: objects speculatively allocated in that transaction (detected by seq(object)>=seq(transaction)) are freed (Free)

5) commit of a transaction: objects speculatively freed in that transaction that are not speculatively free in the context of the containing transaction (detected by seq(object)>=seq (transaction) after pop(seq(transaction))) are freed (Free).

Further examples of the various states are provided below.

An example of a speculative allocation is described as follows: TABLE-US-00002 transaction {x=malloc(size); // point A}//point B In this example, a memory allocation occurs inside a transaction. If the transaction commits, then the memory has been allocated. On the other hand, if the transaction aborts, then the state is as if the allocation never occurred, and the allocation should be undone (freed). The state of the memory at point A is referred to as speculatively allocated. After the transaction commits (at point B, for example), the allocation is committed and the state is no longer speculatively allocated.

An example of a speculative free state is described as follows: TABLE-US-00003 x=malloc(size); transaction{free (x); //point A}//point B In this example, a memory allocation occurs prior to the start of the transaction, so the allocation is non-speculative. However, a free operation occurs inside a transaction. If the transaction commits, the memory should be freed. On the other hand, if the transaction aborts, the memory should remain allocated. The state of the memory at point A is referred to as speculatively free. After the transaction commits (at pointB, for example), the free is committed (also "balanced") and is no longer speculatively free.

A balanced free example is described as follows: TABLE-US-00004 transaction {x=malloc(size); //point A free(x); //point B}

In this example, a memory allocation and a corresponding deallocation both occur within a transaction. When the memory is first allocated (point A), the situation is identical to the speculatively allocated case, described above. However, once the free has executed (point B), the free is now balanced. That is, if the transaction aborts, neither the allocation nor the free have happened since the operation of the transaction is rolled back to the previous state. Accordingly, the memory is free, just as it was prior to being allocated in the transaction. Likewise, if the transaction commits, both the malloc and the free are being committed, so the end result is still that the block of memory is free. Moreover, it no longer matters (at point B) whether the transaction commits or aborts (the memory is free regardless). Thus, the free is balanced and may be readily processed. Additionally, as described below, the associated memory block no longer appears in either the commit or undo logs once it has become balanced free.

The balanced free state is an important consideration. As further example, take the following case: TABLE-US-00005 transaction {for (i=0; i<really_big_number; i++) {x=malloc (size); free(x);}}

In this example, memory allocated in each loop iteration is balanced at the end of that loop iteration and may be readily freed. The memory manager 204 may allocate during the transaction but before the end of the transaction. If the memory manager 204 defers the free operation until the end of the transaction, this loop may use an unbounded quantity of memory, which is not a desirable result for the memory manager 204.

An illustrative nested transaction example is provided as follows: TABLE-US-00006//outside transactions, seq=0 x=malloc(size); //seq=0 z=NULL; transaction{//seq=1 y=malloc(size); //seq=1 transaction{//seq=2 free(x); //2> 0->speculatively free free(y); //2>1 ->speculatively free z=malloc(size); //seq=2}//1>0 true ->free(x) still speculatively free//1>1 false ->free(y) balanced after commit// z's record still present in undo log until final commit transaction{//seq=3 free(z); //3>2, so the free is speculative (only added to commit log) abort( ); //commit log is rolled back to checkpoint taken at transaction start, canceling the speculative free of z. Note that x is freed prior to this checkpoint, so that free is not canceled here. //}abort( ); //commit log is rolled back to position of checkpoint taken at transaction start, canceling the speculative free of x. undo log is rolled back until seq(object)=seq(trans), freeing the speculative allocations along the way (z in this example)//}

Figure 3:
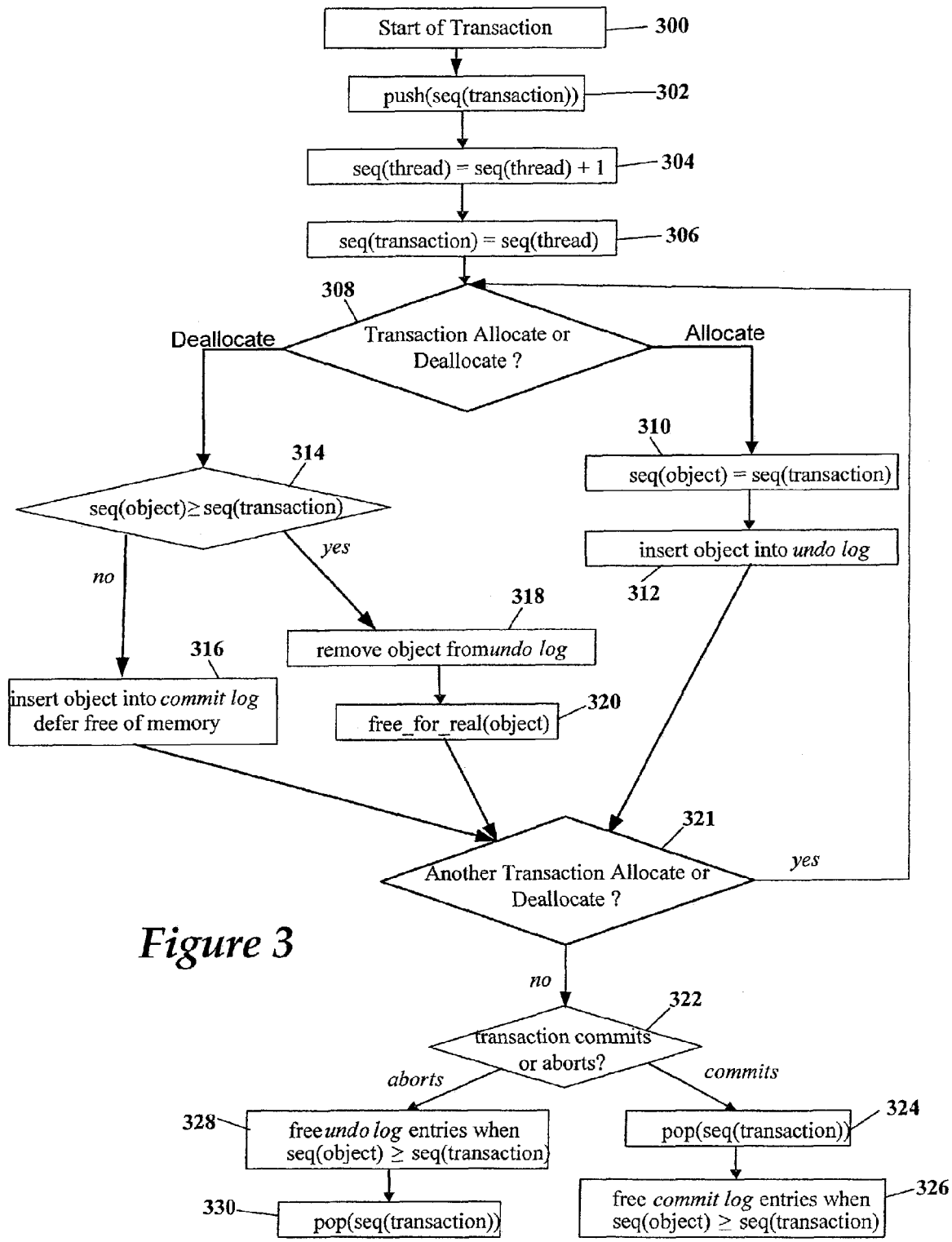
FIG. 3 is a flow diagram for managing memory while in a transaction, under an embodiment.

FIG. 3 is a flow diagram for managing memory while in a transaction, such as a transactional code block, under an embodiment. FIG. 2 will be referenced in the description of the flow of FIG. 3. For example, an application (or program) 202 may specify one or more code blocks as transactional code blocks, which may include nested transactions. The application 202 may delineate the start of a transaction by calling a routine, such as start transaction routine 212, in the software transactional memory library 206 for example. At 300, a transaction starts.

At 302-306, the called routine sets up a transactional state 210e and allocates a sequence number 210b to the transaction. The states may then be saved to thread local storage 208. As used herein, the sequence number of a transaction is referred to as "seq(transaction)" and is used in various operations described below. According to an embodiment, the transaction's sequence number 210b is set to an incremented value of a thread-local sequence counter 210a. If within a nested transaction, the routine pushes the transactional state, including the original or prior transaction's sequence number associated with this state, onto a nested transaction stack 210f as part of the operation. The terms "pop" and "push" refer to operations performed on a stack data structure, such as the nested transaction stack 210f. The nested transaction stack 210f may also be used to support nested transactions independent of using sequence numbers. Stack operations include, but are not limited to, creating a new stack, pushing a new item onto the stack, and/or popping an item off of the stack.

At 308, the flow proceeds with determining whether a transaction is attempting an allocation or deallocation procedure. That is, a transaction code block may include one or more allocation or deallocation calls within the code structure. In an embodiment, the memory manager 204 provides an interface for the application 202 to allocate and deallocate areas or blocks of memory while in a transaction, including nested transactions. The memory manager 204 may call various routines from the software transactional memory library 206, such as during allocating and deallocating procedures, as described below.

If the transaction includes a call for an allocation procedure, the memory manager 204 may call a routine, such as allocation routine 214, in the software transactional memory library 206 for the allocation procedure. At 310, in addition to allocating an object 205 (e.g. block of memory), the sequence number 205b of the object 205 that may be allocated is set to the sequence number 210b of the current transaction (e.g. the sequence number of the current transaction is placed in the allocated object's sequence number field). As used herein, the sequence number of an object is referred to as "seq(object)" and is used in various operations described below. At 312, a record for the object 205 is inserted into the undo log 210c.

In an embodiment, the allocation routine 214, when called, performs as follows: TABLE-US-00007 malloc(size_t size) {p=typical$_{13}$ malloc actions(size); if (in_transaction) {sequence_number(p)=sequence_number(current_transaction); insert_undo_log_entry(p); flagged_for_transactional_malloc=TRUE; }return p; }

If the transaction includes a call for a deallocation procedure, the memory manager 204 may call a routine, such as deallocation routine 216, in the software transactional memory library 206 for the deallocation procedure. At 314, the sequence number 205b of the object 205 is compared to the transaction sequence number 210b. The relationship between the sequence numbers determines whether the free is a balanced free or if the object 205 is speculatively free. If the sequence number 205b of the object 205 is less than the transaction sequence number 210b, then the object 205 may have been allocated outside of the current transaction, and at 316, the object 205 is inserted into the commit log 210d. At this point, the object 205 is speculatively free and the freeing of the associated memory block may be deferred until a later point. Conversely, if the sequence number 205b of the object 205 is greater than or equal to the transaction sequence number 210b, then at 318-320, the object 205 is removed from the undo log 210c and the object 205 may be safely freed.

In an embodiment, the deallocation (free) routine 216, when called, performs the following: TABLE-US-00008 free (pointer p) {if (in_transaction) {if (sequence_number (p)>=sequence_number(current_transaction)) {remove_undo_log_entry(p); free_for_real(p); } else {insert_commit_log_entry(p); flagged_for_transactional_malloc=TRUE; }} else {free_for_real(p); }}

At 321, again it is determined whether a transaction is attempting an allocation or deallocation procedure. If a transaction is attempting another allocation or deallocation procedure, the flow returns to 308 and continues as described above. If a transaction is not attempting another allocation or deallocation procedure, the flow proceeds to 322. At 322, the application 202 may commit or abort the transaction. For example, the application 202 may delineate when to commit or abort a transaction by calling a routine, such as the commit routine 218 or abort routine 220, in the software transactional memory library 206. Additionally, if transaction's atomicity is found to have been violated by some other transaction or operation upon a requested commit, the transaction may also be aborted. The commit routine 218 or abort routine 220 may call associated commit or abort hooks using the memory manager 204, when appropriate, in order to process the commit log 210d and/or undo log 210c.

If the transaction commits, at 324, the sequence number of a parent transaction is popped from the stack 210f as part of the operation of the software transactional memory library 206 when returning from a nested transaction. Additionally, for a top-level commit, all speculatively allocated objects are allocated, including resetting or emptying the undo log 210c. That is, once a transaction commits, there should not be a need to undo the transaction. At 326, the commit log 210d is processed and the sequence number of entries therein are compared to the sequence number of the parent transaction. This comparison determines whether one or more objects in the commit log 210d remain speculatively free or have become balanced free. If an object, such as object 205, has become balanced free, it is removed from the commit log 210d and is freed.

In an embodiment, the commit routine 218, when called, performs the following: TABLE-US-00009 commit( )) {perform_typical_commit_actions( ) if (flagged_for_transactional_malloc) {pop_sequence_number( ) for_each object in commit_log scanning backwards {if (object==commit_log_checkpoint) {break;} if (sequence_number(object)>=sequence_number(transaction)) {free_for_real(object); }} if (nesting_depth=0) {reset_undo_log( ); flagged_for_transactional_malloc=FALSE; } pop_commit_log_checkpoint( );}}

If the transaction aborts, in addition to the software transactional memory library 206 abort actions, the undo log 210c and commit log 210d may be examined. In an embodiment, the undo log 210c is scanned backwards, comparing sequence numbers to determine if any objects were speculatively allocated within the transaction being aborted. Any aborted allocations may then be rolled back and freed. Additionally, any entries in the commit log 210d inserted during the aborted transaction are abandoned, thereby restoring the commit log 210d to a state prior to the aborted transaction. At 328, undo log entries are freed for cases when the sequence number of an object is greater than or equal to the transaction sequence number 210b. At 330, the sequence number of a parent transaction is popped from the stack 210f as part of the operation of the software transactional memory library 206 when returning from a nested transaction.

In an embodiment, the abort routine 220, when called, performs the following: TABLE-US-00010 abort( ) {perform_typical_abort_actions( ); if (flagged_for_transactional_ malloc) {for_each_object_in undo_log scanning backwards {if (sequence_number(object)<sequence_number(transaction)) {break;} free_for_real(object);} restore_commit_log_to_checkpoint( ); pop_sequence_number( ); flagged_for_transactional_malloc=FALSE;}}

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

The term "processor" as generally used herein refers to any logic processing unit, such as one or more central processing units ("CPU"), digital signal processors ("DSP"), application-specific integrated circuits ("ASIC"), etc. While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. For example, while only one aspect is recited as embodied in machine-readable medium, other aspects may likewise be embodied in machine-readable medium. Accordingly, the inventors reserve the right to add additional claims after filing the application to pursue such additional claim forms for other aspects as well.

The invention claimed is:

1. A computer-readable storage medium having stored thereon instructions which, when executed in a processing system, cause the system to:
   execute a first thread, the first thread included in a plurality of threads to be executed concurrently, the first thread to include an atomic transaction;
   associate memory allocated by the atomic transaction with an identifier during execution of the atomic transaction, the identifier to distinguish the atomic transaction from other transactions associated with the first thread;
   execute a request for deallocation of a memory portion allocated by the atomic transaction;
   defer deallocation of the memory portion;
   record the memory portion associated with the deallocation request in a data structure, the data structure to list memory objects to be freed if the atomic transaction commits; and
   based at least in part on the identifier, free the memory portion responsive to successful commit of the atomic transaction.

2. The computer-readable storage medium of claim 1, the plurality of threads to be executed concurrently via a multi-core processor.

3. The computer-readable storage medium of claim 1, the plurality of threads to be executed concurrently via a plurality of processors.

4. The computer-readable storage medium of claim 1, wherein the instructions further cause the system to store the identifier and the data structure in thread-local storage.

5. The computer-readable storage medium of claim 1, wherein the memory allocated by the atomic transactions comprises shared memory.

6. The computer-readable storage medium of claim 1, wherein the instructions further cause the system to execute a call to access a software transactional memory library during execution of the atomic transaction.

7. A system comprising:
   at least one processor to execute a first thread, the first thread included in a plurality of threads to be executed concurrently, the first thread to include an atomic transaction;
   a transactional memory library to associate memory allocated by the atomic transaction with an identifier during execution of the atomic transaction, the identifier to distinguish the atomic transaction from other transactions associated with the first thread; and
   a memory manager to
     execute a request for deallocation of a memory portion allocated by the atomic transaction,
     defer deallocation of the memory portion, record the memory portion associated with the deallocation request in a data structure, the data structure to list memory objects to be freed if the atomic transaction commits, and based at least in part on the identifier, free the memory portion responsive to successful commit of the atomic transaction.

8. The system of claim 7, wherein the at least one processor comprises a multi-core processor.

9. The system of claim 7, wherein the at least one processor comprises a plurality of processors.

10. The system of claim 7, the transactional memory library to further store the identifier and the data structure in thread-local storage.

11. The system of claim 7, wherein the memory allocated by the atomic transactions comprises shared memory.

12. A method comprising:

executing a first thread, the first thread included in a plurality of threads to be executed concurrently via at least one processor, the first thread to include an atomic transaction;

associating memory allocated by the atomic transaction with an identifier during execution of the atomic transaction, the identifier to distinguish the atomic transaction from all other transactions associated with the first thread;

executing a request for deallocation of a memory portion allocated by the atomic transaction;

deferring deallocation of the memory portion;

recording the memory portion associated with the deallocation request in a data structure, the data structure to list memory objects to be freed if the atomic transaction commits; and based at least in part on the identifier, freeing the memory portion responsive to successful commit of the atomic transaction.

13. The method of claim 12, wherein the at least one processor comprises a plurality of processors.

14. The method of claim 12, wherein the at least one processor comprises a multi-core processor.

15. The method of claim 12, further comprising storing the identifier and the data structure in thread-local storage.

16. The method of claim 12, wherein the memory allocated by the atomic transactions comprises shared memory.

17. The method of claim 12, further comprising executing a call to access a software transactional memory library during execution of the atomic transaction.

\* \* \* \* \*